United States Patent

[11] 3,572,634

| [72] | Inventor | Gaylord B. Haviland<br>Mainville, Ohio |
|---|---|---|
| [21] | Appl. No. | 786,916 |
| [22] | Filed | Dec. 26, 1968 |
| [45] | Patented | Mar. 30, 1971 |
| [73] | Assignee | Big Four Automotive Equipment<br>Corporation |

[54] AUTOMOTIVE JACK WITH SAFETY PRESSURE RELEASE
9 Claims, 6 Drawing Figs.

[52] U.S. Cl. .................................................. 254/2,
254/93, 251/319, 91/435
[51] Int. Cl. .................................................... B60p 1/00,
B66f 3/24, F15b 11/04
[50] Field of Search ........................................... 254/2, 93;
91/400, 401, 435; 92/23, 25, 30; 251/319

[56] References Cited
UNITED STATES PATENTS

| 3,130,956 | 4/1964 | Mandelko .................... | 254/2. |
| 3,268,208 | 8/1966 | Feilbach ...................... | 254/2. |

*Primary Examiner*—Othell M. Simpson
*Assistant Examiner*—David R. Melton
*Attorney*—Molinare, Allegretti, Newitt and Witcoff ABSTRACT: An automotive lift or jack having safety pressure release means for releasing pressure from the pressure chamber within the piston and cylinder means in the event the load is suddenly dropped or freed from the support means on the jack.

Patented March 30, 1971
3,572,634
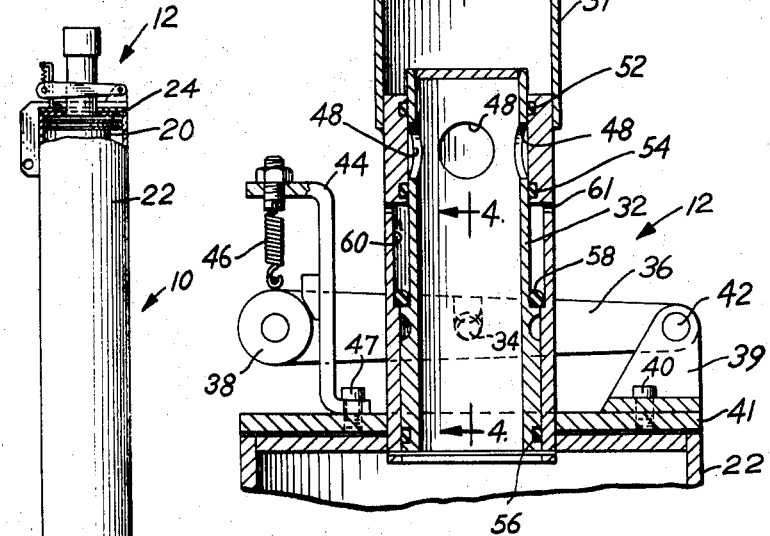
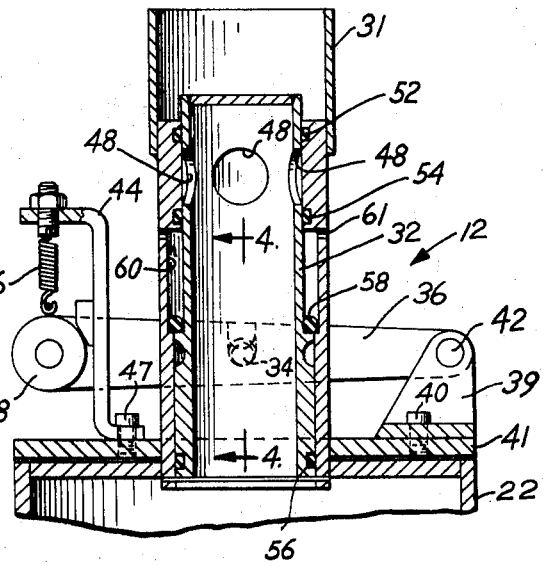
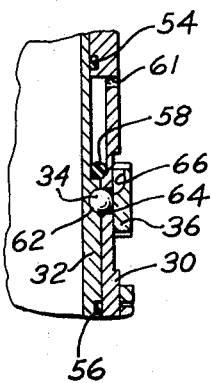
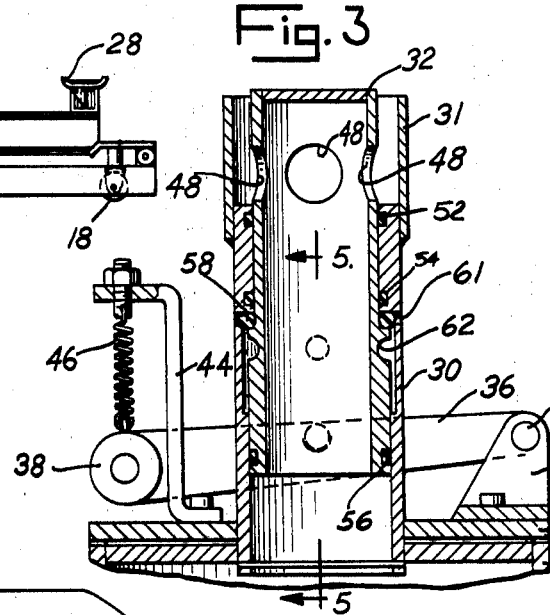
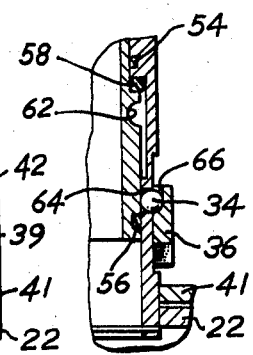
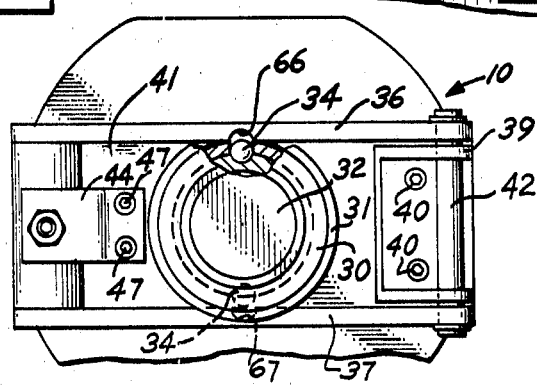
INVENTOR.
GAYLORD B. HAVILAND
BY
ATTORNEYS

AUTOMOTIVE JACK WITH SAFETY PRESSURE RELEASE

BACKGROUND OF THE INVENTION

This invention relates to a air-powered lift or jack for automobiles or like loads and, more particularly, to an improved air-powered lift incorporating an air-pressure safety release device.

One type of jack or lift for automobiles or like loads comprises a housing adapted to be movably supported on the ground. Provided in the housing is a cylinder. A piston is disposed in the cylinder and cooperates with the cylinder to define a pressure chamber within the cylinder. Introduction of air under pressure into the chamber will raise the cylinder relative to the piston and piston rod secured thereto. A bracket with saddle arms for gripping a bumper or bumper supports for an automobile is fixedly secured to the cylinder and is movable up and down therewith.

In the event the automobile bumper slips from the saddle arms, the pressure fluid, which is generally compressed air, will cause the cylinder to shoot upwardly rapidly, carrying the bracket and saddle arms with it. This can result in damage to the automobile and the jack, and possibly result in injury to the jack operator.

An object of the present invention is to provide an improved jack having an air-pressure release device for quickly relieving pressure in the event the load is suddenly released or freed from the jack.

Another object of this invention is to provide an improved compressed-air-powered jack for automobiles or like loads which includes means for releasing the air pressure for actuating the power piston rapidly in the event the automobile is suddenly released or dropped from the jack. Other objects and advantages of this invention will be made more apparent hereinafter.

BRIEF DESCRIPTION OF THE DRAWING

The invention will best be understood by reference to the accompanying drawing which illustrates a preferred form of the present invention and in which:

FIG. 1 is an elevation view, with parts broken away, of an improved automotive jack embodying the safety release means of the present invention;

FIG. 2 is a detail cross-sectional view on an enlarged scale illustrating the safety release means of the present invention, with the vent means in the safety release means being closed;

FIG. 3 is a detail cross-sectional view similar to FIG. 2, but illustrating the safety release means in position with the vent means open;

FIG. 4 is a detail view of the releaseable locking means taken generally along the line 4-4 of FIG. 2;

FIG. 5 is a detail view of the releasable locking means taken generally along the line 5-5 of FIG. 3; and FIG. 6 is a partial top view of the automotive jack embodying the present invention.

DETAILED DESCRIPTION OF THE PREFERRED EMBODIMENT OF THE PRESENT INVENTION

Referring to FIG. 1, there is illustrated an automotive jack or lift 10 embodying the safety release means 12 of the present invention. The fluid-powered automotive jack or lift includes a movable base 14 adapted to be rolled upon the ground or like support surface on the wheels 16 and 18. The tires 16 may be relatively large and of a semipneumatic type so as to afford easier mobility and permit the base 14 to rest solidly on the floor under load. The wheels 18 are of the caster type to permit swinging the jack 10 into working position as desired. Secured to the movable base or housing 14 of the automotive jack 10 is a piston member 20 which is disposed within a cylinder 22 that is movable relative to the piston member 20 affixed to the base 14. Introduction of the power fluid, as, for example, compressed air, into the pressure chamber 24 will cause movement of the power cylinder 22 upwardly with respect to the piston member and the base 14. Secured to the power cylinder 22 and extending outwardly therefrom are the saddle arms or support arms 26 which carry at the ends thereof, mounting cushions 28 for gripping and supporting the bumper or the bumper supports of an automobile.

The safety release means 12 of the present invention is secured to the top of the power or lift cylinder 22 as shown in FIG. 1. The structure and operation of the safety release means 12 will best be seen by reference to FIGS. 2—6. In FIGS. 2 and 4, there is illustrated the position of the components of the safety release means in the normal inoperative position with the vent means closed and in FIGS. 3 and 5, there is illustrated the portion of the components of the safety release means for venting the power chamber 24.

The safety release means 12 includes a sleeve member 30 that is rigidly affixed to the cylinder 22. Slidably disposed within the tubular part 30 is a piston member 32. The piston member 32 is retained in position with respect to the tubular part by means of the releasable locking means 34 disposed operatively between the tubular part 30, the piston member 32 and the arm members 36, 37 (FIG. 6). The arm members 36, 37 are pivoted at one end upon a bracket 39 secured to a bracket 41 by means of suitable fastening means, as, for example, the bolts 40. Bracket 41 is, in turn, connected to the top of the cylinder. A pivot pin 42 carried in bracket 39 provides the journal for the arms 36 and 37. The opposite ends of the arms 36 and 37 are connected by a weighted connecting bar 38 that is operatively connected to a bracket 44 by means of a spring 46 which tensions the arms 36, 37 upwardly with respect to the bracket 44 as seen in FIG. 2. The spring tension of spring 46 can be adjusted by means of the threaded shaft and vent mounting of the upper end of spring 46.

Defined within the piston member 32 near the top thereof are a plurality of vent openings or ports 48 which are adapted to provide communication between the interior of the hollow piston 32 and the atmosphere. As shown in FIG. 2, during normal operation, the ports 48 are confined within within the enlarged cylinder portion 31 of the tubular part 30, with O-rings 52 and 54 being disposed in recesses in the enlarged portion 31 on opposite sides of the vent openings 48 so as to seal the annular space between the piston member 32 and tubular part 30 and prevent the escape of compressed air or power fluid from within the piston member 32 to the atmosphere. A sealing ring 56 is provided at the lower end of the piston member 32 to seal between the piston member 32 and the tubular part 30. The O-ring 58 provided in a recessed area 60 between the tubular part 30 and the piston 32 member serves as a buffer to take up the shock of impact when the piston member 32 moves upwardly rapidly with respect to the tubular part or sleeve 30. Opening 61 in the wall of tubular part 30 permits rapid discharges of air from the space 60 during upward movement of the piston member 32 relative to the tubular part 30.

With reference to FIG. 4 it is seen that the releasable locking means includes a ball 34 retained in a recess or groove 62 in the exterior surface of piston 32 and in a cooperating bore or opening 64 in the tubular part 30. The ball 34 is retained in locking engagement with the recess 62 by virtue of the relative position of the arms 36 and 37 of the safety release device with respect to the part 30. That is, when the arms 36, 37 are in the position shown in FIGS. 2 and 4, the balls 34 are held in engagement with the piston member 32 preventing relative movement between the piston 32 and the tubular part 30.

Turning now to FIGS. 3 and 5, there is illustrated the position of the safety release means 12 with the port or vent means 48 venting to atmosphere. In the event that the load should be dropped or suddenly released from the blocks 28 on the support arms 26, the pressure within the power chamber 24 will cause the cylinder 22 to move upwardly rapidly with respect to the fixed piston 20. The arms 36 and 37, which are provided at one end with a weighted connecting bar 38, will tend to remain at rest as the cylinder and the tubular part 30 carried therewith move upwardly. As the result of the relative movement between the arms 36, 37 and the tubular part 30, the balls 34 will be permitted to move from the recesses or grooves 62 in the piston 32 into the recessed areas 66, 67 within the arms 36, 37, respectively. The result will be that the balls will be freed from the piston 32, permitting the pressure within the piston 32 to urge the piston 32 upwardly relative to the tubular part 30. The port means 48 will be moved above the O-rings 52 and 54 so as to permit venting of fluid within the piston part and the chamber 24 to the atmosphere. The internal pressure within the chamber 24 will be rapidly released so as to stop the rapid upward movement of the cylinder 22. In addition, the air escaping upwardly within the confines of the narrow annular space between the top of the piston part 32 and the top 31 of the tubular part 30 will create a reaction force downward which will tend to reduce the upward movement of the cylinder 22.

Upon release of the pressure from within the chamber 24, the spring 46 will return the arms 36, 37 from the position shown in FIG. 3 to their staring position as shown in FIG. 2, with the balls 34 being moved back to their initial position in the recesses in tubular part 62 to lock the tubular part 34 with respect to the piston 32. The recesses 66, 67 are defined by a cam surface which functions to cam the balls 34 to their initial position.

In FIG. 6, there is illustrated the top of automotive jack 10 wherein there is better seen the relationship of the arms 36, 37 with respect to one another and to the tubular part 30. It is seen that at one end (the right side as viewed in FIG. 6), the two arms 36, 37 are joined to the pivot pin 42 which is journaled in the bracket 39 that is secured to the top of the cylinder 22 for movement therewith. The bracket 44 is connected to the plate 41 affixed to the top of the cylinder 22 by means of the screws 47. As shown, two balls 34 are provided on opposite sides of the tubular part 30 for releasably locking the members 30 and 32 with respect to one another.

There has been provided by the present invention an improved automotive jack having safety release means for releasing pressure from within the pressure chamber of the piston and cylinder means in the event that the load should suddenly be released or dropped from the jack. The safety release functions reliably and in a positive manner. The invention can readily be adapted to existing automotive jacks or lifts.

While I have shown a presently preferred form of the invention, it will be understood that the invention is not limited thereto, since it may be otherwise embodied within the scope of the following Claims.

I claim:

1. In a fluid-powered lift including a housing adapted to be moved on a support surface, piston and cylinder means on said housing, said cylinder being movable with respect to said piston and housing and having support means extending outwardly therefrom for engaging with and supporting a load, said piston and cylinder cooperating to define a power chamber adapted to be communicated to a source of fluid pressure, whereby the increase of fluid pressure in said chamber will raise said cylinder and the decrease of fluid pressure will permit lowering of said cylinder, the improvement characterized by fluid pressure safety release means on the cylinder and movable therewith, said safety release means being normally closed to prevent escape of fluid pressure from said power chamber, and being operable automatically upon sudden release of the load from the support means to open and vent fluid pressure from said chamber to prevent rapid and continued upward movement of said cylinder.

2. A lift as in claim 1 wherein the safety release means includes a tubular member connected to said cylinder and communicating with said chamber therein, a piston member movable in said tubular member, said piston member having port means therein, the piston member being normally positioned in a first position relative to said tubular member to close the port means, and releasable locking means for holding the piston member in said first position and for releasing same in the event the load is suddenly dropped or removed from the support means.

3. In a fluid-powered lift including a housing adapted to be moved on a support surface, piston and cylinder means on said housing, said cylinder being movable with respect to said piston and housing and having support means extending outwardly therefrom for engaging with and supporting a load, said piston and cylinder cooperating to define a power chamber adapted to be communicated to a source of fluid pressure, whereby the increase of fluid pressure in said chamber will raise said cylinder and the decrease of fluid pressure will permit lowering of said cylinder, the improvement characterized by fluid pressure safety release means on the cylinder and movable therewith, said safety release means being normally closed to prevent escape of fluid pressure from said power chamber, and being operable automatically upon sudden release of the load from the support means to open and vent fluid pressure from said chamber to prevent rapid and continued upward movement of said cylinder, said safety release means including a tubular member connected to said cylinder and communicating with said chamber therein, a piston member movable in said tubular member, said piston member having port means therein, the piston member being normally positioned in a first position relative to said tubular member to close the port means, and releasable locking means for holding the piston member in said first position and for releasing same in the event the load is suddenly dropped or removed from the support means, said releasable locking means including weighted arm means pivoted on said cylinder and operatively connected to said piston member for releasably retaining same in said first position.

4. A lift as in claim 3 wherein said releasable locking means includes hold means disposed between the tubular member and piston member for releasably holding said member in said first position wherein the port means is closed, said hold means being released by movement of said weighted arm means upon sudden release of a load to permit the piston member to move relative to the tubular member to open the port means.

5. A lift as in claim 4 wherein the port means communicates said chamber to the atmosphere sand said fluid is compressed air, whereby said compressed air will be vented to atmosphere when the port means is opened upon sudden release of a load from the lift.

6. A lift as in claim 4 wherein the hold means comprises a ball member movable within a bore in the tubular member into and out of a cooperating recess in the piston member, said ball member being held in engaged position with said recess in the piston member when said arm means are in a first upper position and being released from said recess when said arm means are moved to a relatively lower position upon sudden upward movement of said cylinder due to sudden release of the load.

7. A lift as in claim 6 wherein the arm means are pivoted at one end on said cylinder and are biased to their first upper position by spring means, said arm means being engageable with said ball member to retain the ball member in the recess in the piston member and being movable relative to the tubular member and the ball member to permit the ball member to be disengaged from the recess in the piston member.

8. A lift in claim 7 including recess means in the arm means for receiving the ball member when it is disengaged from the recess in the piston member.

9. A lift as in claim 8 wherein the recess means in the arm means includes a cam surface for camming the ball member toward locking engagement with the piston member when the arm means are moved upwardly relative to the tubular member.